US010440317B2

(12) United States Patent
Matsumoto et al.

(10) Patent No.: US 10,440,317 B2
(45) Date of Patent: Oct. 8, 2019

(54) VIDEO PROCESSING DEVICE

(71) Applicant: DENSO TEN Limited, Kobe-shi, Hyogo (JP)

(72) Inventors: Takeo Matsumoto, Kobe (JP); Kohji Ohnishi, Kobe (JP); Takayuki Ozasa, Kobe (JP); Tomoyuki Fujimoto, Kobe (JP); Teruhiko Kamibayashi, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 15/827,429

(22) Filed: Nov. 30, 2017

(65) Prior Publication Data

US 2018/0176504 A1 Jun. 21, 2018

(30) Foreign Application Priority Data

Dec. 19, 2016 (JP) ................................. 2016-245777

(51) Int. Cl.
*H04N 7/01* (2006.01)
*G09G 3/36* (2006.01)
*G09G 3/20* (2006.01)
*G01C 21/36* (2006.01)

(52) U.S. Cl.
CPC ........... *H04N 7/012* (2013.01); *G09G 3/2096* (2013.01); *G09G 3/3614* (2013.01); *G09G 3/3655* (2013.01); *G01C 21/36* (2013.01); *G09G 2300/0495* (2013.01); *G09G 2310/0224* (2013.01); *G09G 2310/06* (2013.01); *G09G 2320/0257* (2013.01); *G09G 2320/041* (2013.01); *G09G 2360/02* (2013.01); *G09G 2380/10* (2013.01)

(58) Field of Classification Search
None
See application file for complete search history.

(56) References Cited

U.S. PATENT DOCUMENTS

| 2013/0169618 | A1* | 7/2013 | Kobayashi | G09G 5/10 345/212 |
| 2014/0333673 | A1* | 11/2014 | Cho | G09G 5/02 345/660 |
| 2017/0025068 | A1* | 1/2017 | Jeoung | G11C 19/28 |

FOREIGN PATENT DOCUMENTS

| JP | 2004-045741 A | 2/2004 |
| JP | 2005-352190 A | 12/2005 |
| JP | 2009-037209 A | 2/2009 |
| JP | 2009-122364 A | 6/2009 |

* cited by examiner

*Primary Examiner* — Joseph R Haley
*Assistant Examiner* — Emily J Frank
(74) *Attorney, Agent, or Firm* — Oliff PLC

(57) ABSTRACT

A video processing device generates a display video signal to be supplied to a liquid crystal display unit that is driven by a frame inversion scheme. The video processing device includes a controller and a video signal processor. The controller controls a vertical synchronizing signal included in an interlace video signal input from outside the video processing device so that a display invalid section having a predetermined number of fields is set for the interlace video signal at a predetermined period. The video signal processor i) generates the display video signal based on the interlace video signal in which the display invalid section has been set by control of the vertical synchronizing signal and ii) outputs the display video signal to the liquid crystal display unit.

10 Claims, 15 Drawing Sheets

| DISPLAY MODE | SETTING OF STOP CONTROL OF VERTICAL SYNCHRONIZING SIGNAL | PERIOD OF STOP CONTROL (SECOND) |
|---|---|---|
| DVD MODE | ON | n |
| NAVIGATION MODE | OFF | — |
| DTV MODE | OFF | — |
| ON-VEHICLE CAMERA MODE | ON | m |
| ⋮ | ⋮ | ⋮ |

FIG. 8

VIDEO PROCESSING DEVICE

BACKGROUND OF THE INVENTION

Field of the Invention

The invention relates to a technology that generates a display video signal.

Description of the Background Art

In the related art, a liquid crystal display in which an in plane switching method is adopted (in the following, referred to as "IPS liquid crystal display") is known. Such an IPS liquid crystal display is excellent in view angle characteristics and thus, is used as a display device for various scenes such as a wide screen, a large screen, a portable terminal screen, and a screen for an on-vehicle device.

However, in the related art described above, there is still room for improvement on efficient prevention of a residual image phenomenon.

Specifically, the IPS liquid crystal display has a problem that a residual video characteristic is weak and especially, when an interlace video is displayed, a residual video becomes easy to occur in a specific image. For example, although the residual image phenomenon is generated due to occurrence of charge accumulation caused by impurities contained in a liquid crystal layer by a video signal of a specific image, in a case of a non-interlace video, such charge accumulation is eliminated by polarity inversion of a thin film transistor (TFT) electrode of each frame conducted in general liquid crystal display of an active matrix driving type.

However, in a case of the interlace video, one frame is constituted with two fields of an odd-numbered field and an even-numbered field and thus, the video signal of the specific image becomes different between such fields and charge accumulation cannot be eliminated by the above-described polarity inversion. Especially, in a case where a white solid image and a black solid image of which boundaries extend in the field direction, lines (for example, black in the odd-numbered field and white in the even-numbered field) in which polarities are turned to opposite polarities in the odd-numbered field and the even-numbered field may be generated at those boundaries and in this case, a situation that charge accumulation by polarity inversion becomes easy to occur.

SUMMARY OF THE INVENTION

According to one aspect of the invention, a video processing device generates a display video signal to be supplied to a liquid crystal display unit that is driven by a frame inversion scheme. The video processing device includes a controller and a video signal processor. The controller controls a vertical synchronizing signal included in an interlace video signal input from outside the video processing device so that a display invalid section having a predetermined number of fields is set for the interlace video signal at a predetermined period. The video signal processor i) generates the display video signal based on the interlace video signal in which the display invalid section has been set by control of the vertical synchronizing signal and ii) outputs the display video signal to the liquid crystal display unit.

It is possible to efficiently prevent the residual image phenomenon.

According to another aspect of the invention, the video processing device further includes a temperature detector that detects a temperature of the liquid crystal display unit. The controller adjusts the predetermined period based on a detection result of the temperature detector.

According to another aspect of the invention, the controller adjusts the predetermined period to be shortened as the temperature increases.

Therefore, an object of the inventions is to efficiently prevent the residual image phenomenon.

These and other objects, features, aspects and advantages of the invention will become more apparent from the following detailed description of the invention when taken in conjunction with the accompanying drawings.

BRIEF DESCRIPTION OF THE DRAWINGS

FIG. 8 is a diagram illustrating an example of display mode information.

DESCRIPTION OF THE EMBODIMENTS

In the following, embodiments of a video processing device, a video display system, and a video processing method disclosed in the application will be described in detail with reference to the accompanying drawings. The invention is not limited to the embodiments described in the following.

In the following, description will be made on a case where a "liquid crystal display unit" which is a liquid crystal module is an IPS liquid crystal display and is used as an on-vehicle device by way of an example. In the following, after description is made on an outline of the video processing method according to this embodiment using FIG. 1A to FIG. 1F, description will be made on the video processing device of the video display system to which the video processing method according to this embodiment is applied using FIG. 2A to FIG. 9.

FIG. 1A to FIG. 1F are outline explanation diagrams (first to sixth diagrams) of the video processing method according to this embodiment.

Figure 1A:
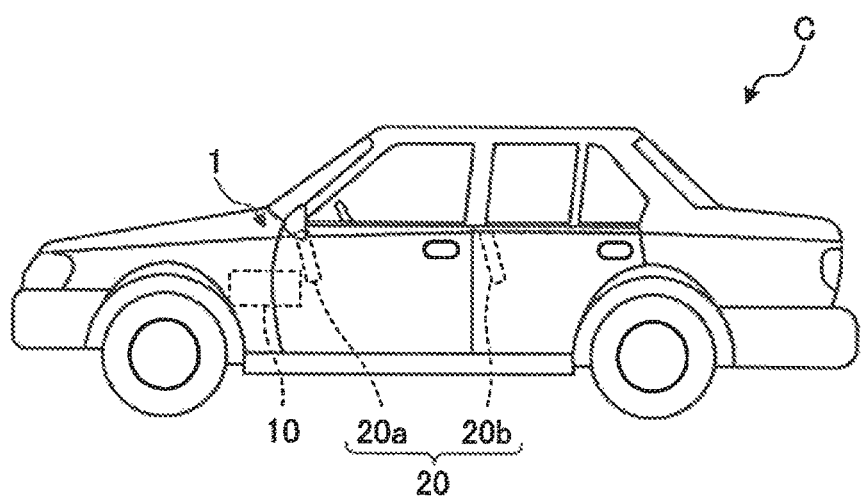
FIG. 1A is an outline explanation diagram (first) of a video processing method according to an embodiment.

As illustrated in FIG. 1A, a video display system 1 according to this embodiment can be used by being mounted on, for example, a vehicle C. The video display system 1 includes a video processing device 10 and a liquid crystal display unit 20. The liquid crystal display unit 20 includes, for example, a first display unit 20a and a second display unit 20b.

The first display unit 20a is one for, for example, a display audio installed at the front of a front seat or the like. The second display unit 20b is one for, for example, a rear seat entertainment system installed at a rear surface of the front seat or the like.

The first display unit 20a can display, for example, a video from an on-vehicle camera (not illustrated) or a navigation video that guides a route to a destination, or the like. The second display unit 20b can display, for example, a video of a digital versatile disc (DVD) player, a video of digital television (DTV) broadcasting, or the like.

In the above, description has been made on specific types of videos to be displayed on the first display unit 20a and the second display unit 20b. However, these are only examples, and the invention is not limited thereto. In the above, the liquid crystal display unit 20 is configured to include the first display unit 20a and the second display unit 20b, but the invention is not limited thereto. For example, the liquid crystal display unit 20 may include either the first display unit 20a or the second display unit 20b, or may include three or more display units.

The video processing device 10 receives a video signal from various video sources such as an on-vehicle camera, conducts video processing on such a video signal to be capable of being displayed on the liquid crystal display unit 20, and outputs the video signal to the liquid crystal display unit 20.

In the meantime, when a liquid crystal is driven with DC in liquid crystal display of a general active matrix drive type, the lifetime is shortened and thus, liquid crystal driving is performed by a frame inversion scheme in which AC is applied so as to inverse polarities of respective electrodes which become sub-pixels per one image (frame).

Figure 1B:
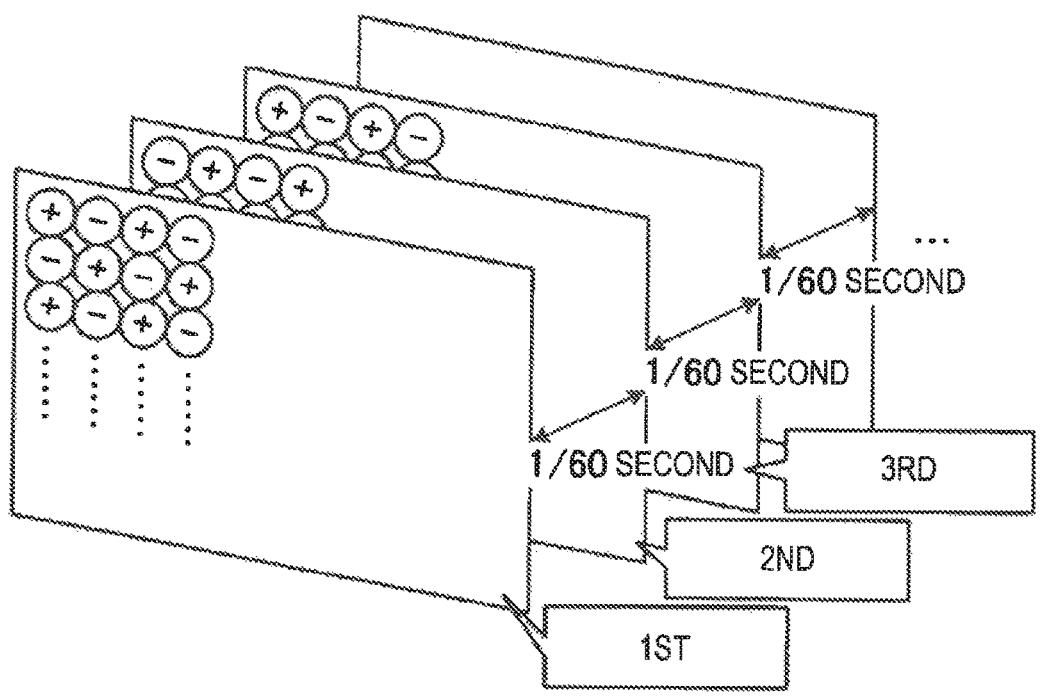
FIG. 1B is the outline explanation diagram (second) of the video processing method according to the embodiment.

For example, a dot matrix inversion drive type among the frame inversion scheme is exemplified in FIG. 1B. In the dot matrix inversion drive system, as illustrated in FIG. 1B, for example, at 1/60 second intervals (that is, 60 Hz), one sub-pixel for each frame of a first, second, and a third frame . . . is alternated to inverse a positive pole and a negative pole of the electrode.

Figure 1C:
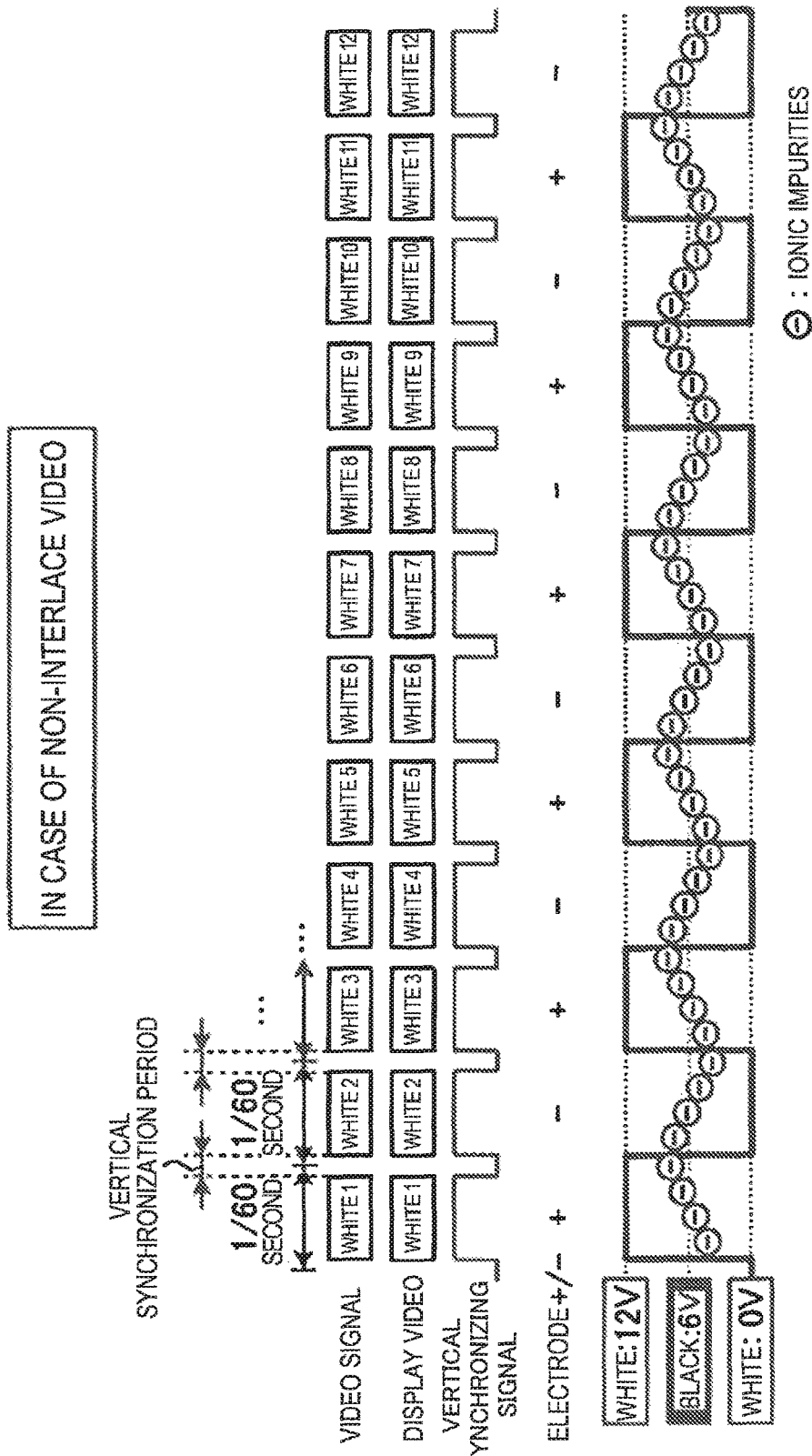
FIG. 1C is the outline explanation diagram (third) of the video processing method according to the embodiment.

With this, for example, as illustrated in FIG. 1C, in a case of a non-interlace video, even when the same video signal (for example, white 1 to white 12) is input between frames for a certain sub-pixel, ionic impurities can be made to exist in the liquid crystal layer without being unevenly distributed, by the influence of the polarity inverted for each frame. That is, the frame inversion scheme has effects of eliminating charge accumulation of the ionic impurities within the liquid crystal layer and preventing the residual image phenomenon.

As illustrated in FIG. 1C, frames are separated by a vertical synchronization period by a vertical synchronizing signal (VSYNC). The vertical synchronizing signal is a signal that shows an input timing of one frame and becomes "L (Low)" at a predetermined period (1/60 seconds here).

The video processing device 10, for example, obtains the video signal from a video source based on (triggered by) an output timing in which the vertical synchronizing signal becomes "L" and displays a display video based on the obtained video signal on the liquid crystal display unit 20. A period between before and after the output timing of vertical synchronizing signal is set as a vertical synchronization period. The video processing device 10 does not normally obtain the video signal in the vertical synchronization period, a display invalid section corresponding to the vertical synchronization period is set for the display video, and thereby frames are separated.

The vertical synchronization period described above can be set based on a number of counts that is obtained, for example, by counting pulse numbers of a horizontal synchronizing signal (HSYNC, not illustrated) that shows the input timing of one row of one frame.

Figure 1D:
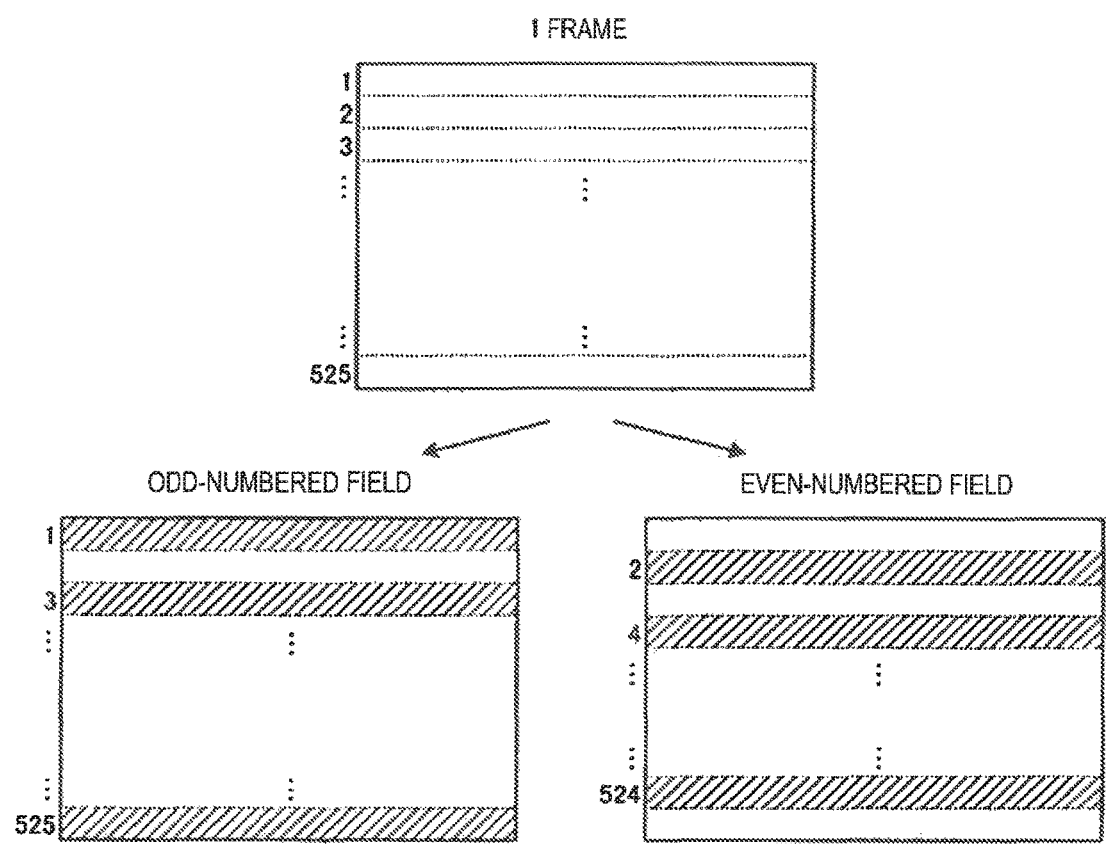
FIG. 1D is the outline explanation diagram (fourth) of the video processing method according to the embodiment.

Here, a case of an interlace video is considered. One frame is assumed as 525 rows. As illustrated in FIG. 1D, in a case of the interlace video, one frame is constituted with two fields of an odd-numbered field formed with only scanning lines of odd-numbered rows and an even-numbered field formed with only scanning lines of even-numbered rows. Such two fields are alternately displayed and thus, even though the video signals of a specific image are the same from a frame unit point of view, the video signals easily become different between fields.

Figure 1E:
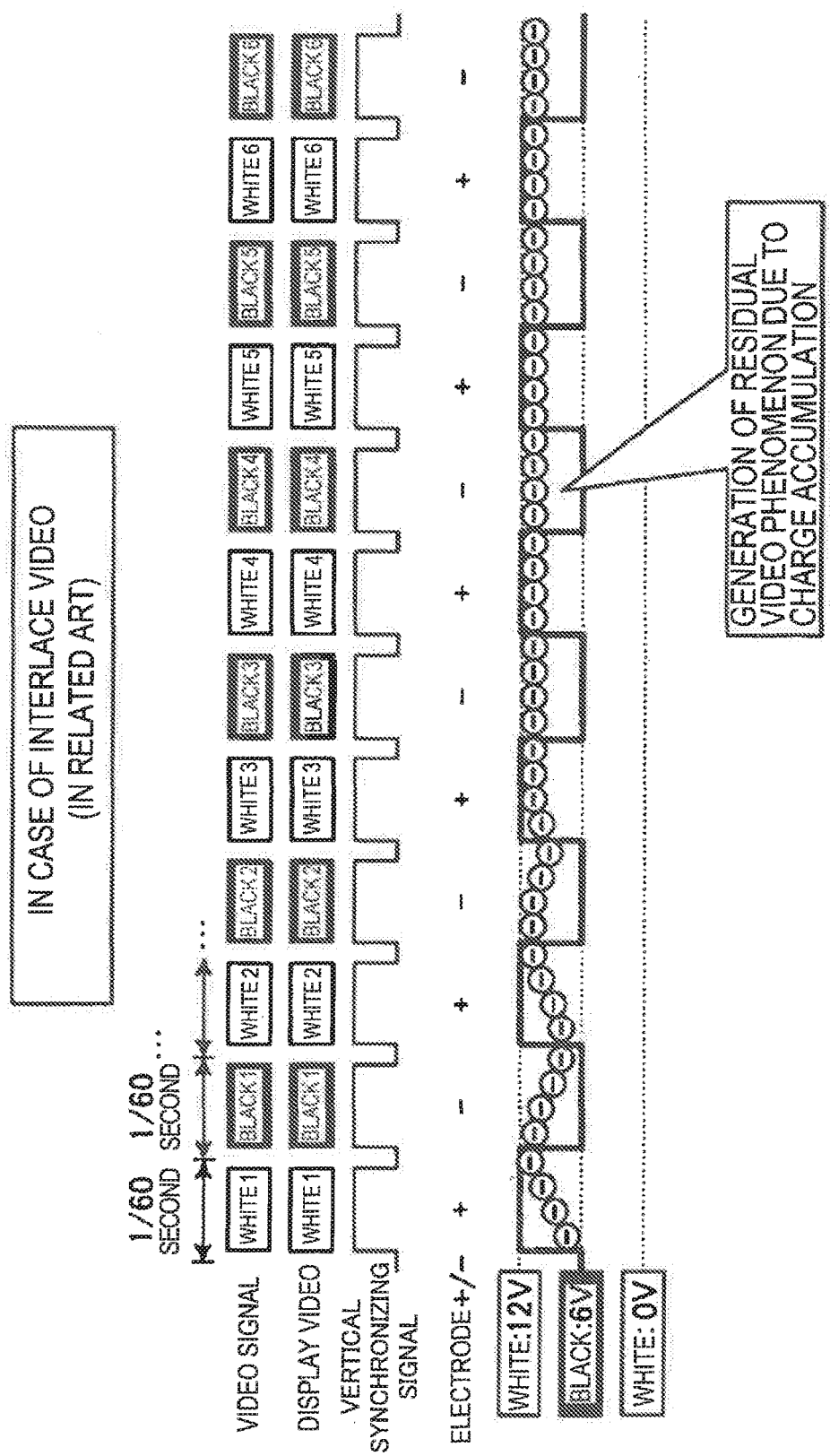
FIG. 1E is the outline explanation diagram (fifth) of the video processing method according to the embodiment.

In order to make easy to understand description, a case where white and black are replaced for each field is exemplified. As illustrated in FIG. 1E, in a case where such an interlace video is displayed by the method of the related art, since deviation of potential of white and black for each field is small, ionic impurities are easily distributed unevenly in the same direction and "generation of residual image phenomenon due to charge accumulation" easily occurs. In a case of the IPS liquid crystal display, ionic impurities may become difficult to move due to a positional relationship between a common electrode and respective electrodes of sub-pixels and the tendency of generation of residual image phenomenon due to charge accumulation is particularly strong.

Here, although matters that charge accumulation is eliminated by directly controlling the polarity of the electrode may be considered, in the present situation, a liquid crystal module in which a liquid crystal panel and a liquid crystal driving driver IC are integrated is mainly used for the liquid crystal display unit 20 and thus, it is thought that there is little realizability.

Figure 1F:
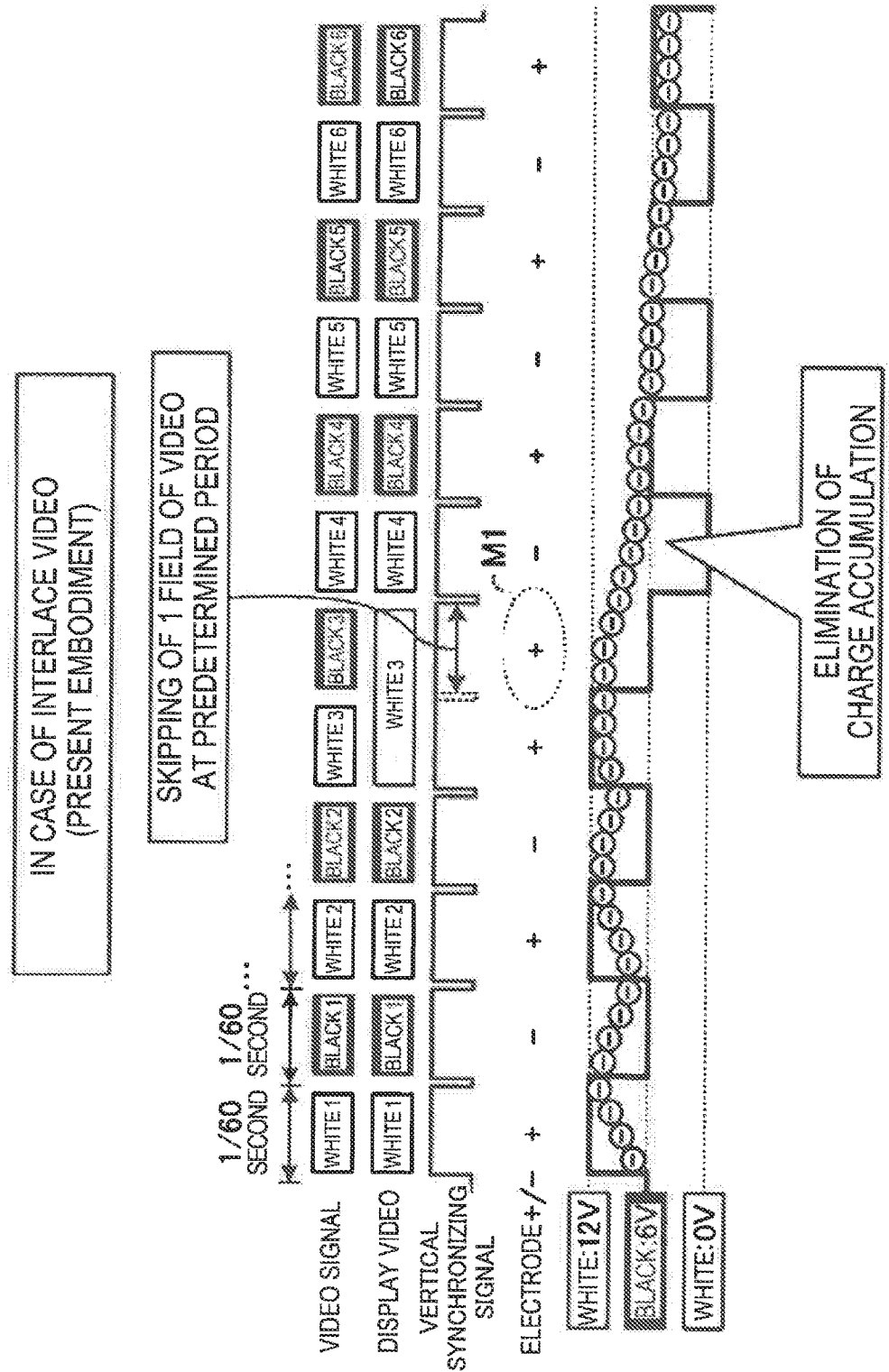
FIG. 1F is the outline explanation diagram (sixth) of the video processing method according to the embodiment.

Therefore, as illustrated in FIG. 1F, in this embodiment, it is assumed that in a case of the interlace video, the video processing device 10 performs "skipping of a video of one field at a predetermined period" to thereby inverse the polarity of the electrode (see a portion surrounded by a closed curve M1 of a broken line in the figure).

Specifically, the video processing device 10 controls the vertical synchronizing signal included in the interlace video signal input from outside such that the display invalid section having a predetermined number of fields (here, one field) is set for the interlace video signal at a predetermined period to thereby cause the video to be skipped.

For example, in an example illustrated in FIG. 1F, the video processing device 10 stops an output of the vertical synchronizing signal at a timing in which a "black 3" of the video signal is input. With this, the video processing device 10 no longer obtains the video signal based on the output timing of the vertical synchronizing signal. As a result, the display invalid section during which the "black 3" of the video signal is not displayed in the display video is set in the display video signal.

With this, a "white 3" of the preceding field is continuously displayed, and thus the polarity "−" to be corresponded to the "black 3" is inverted to "+". Conversely, the polarity "+" corresponding to the "white 3" of the preceding field is continued and not inverted. Since potential of a succeeding "white 4" is turned to the negative pole of the electrode, "elimination of charge accumulation" of ionic impurities is possible. Accordingly, it is possible to efficiently prevent the residual image phenomenon.

As such, in the video processing method according to this embodiment, the vertical synchronizing signal included in the interlace video signal input from outside is controlled such that the display invalid section of one field is set for the interlace video signal at a predetermined period. In the video processing method according to this embodiment, the display video signal is generated based on the interlace video signal in which the display invalid section is set by control of the vertical synchronizing signal and the generated display video signal is output to the liquid crystal display unit 20.

Therefore, according to the video processing method according to this embodiment, it is possible to eliminate charge accumulation of ionic impurities and efficiently prevent the residual image phenomenon even for the interlace video.

In the following, the video processing device 10 of the video display system 1 to which the video processing method described above is applied will be described in further detail. In the following, description of the first embodiment using FIG. 2A to FIG. 5, description of the second embodiment using FIG. 6, and description of the third embodiment using FIG. 7 to FIG. 9 will be sequentially made.

First Embodiment

Figure 2A:
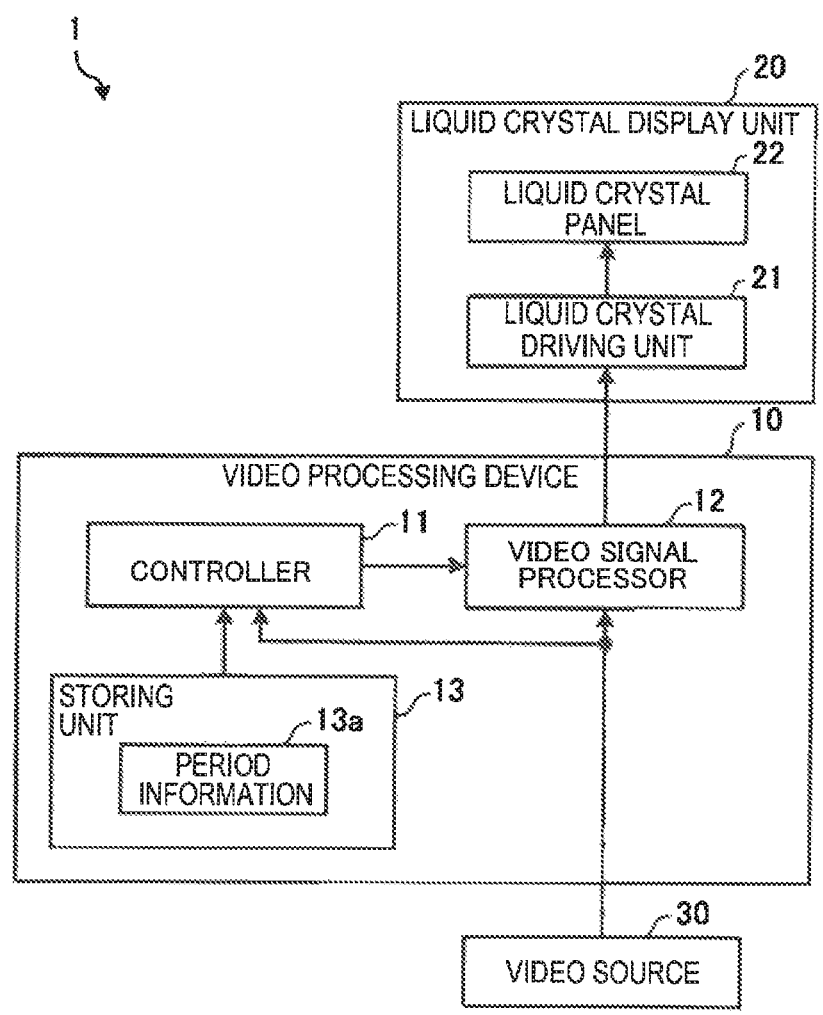
FIG. 2A is a block diagram of a video display system according to a first embodiment.
Figure 2B:
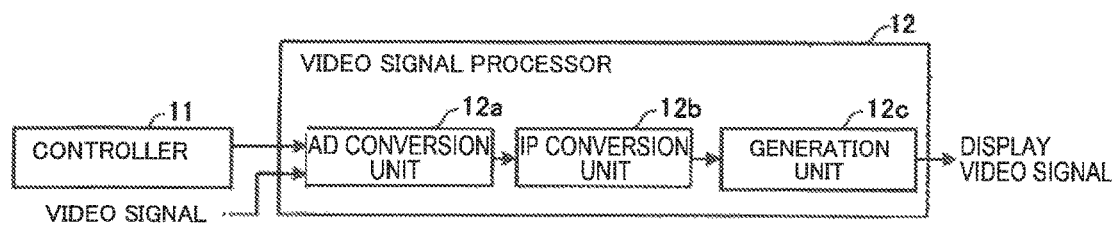
FIG. 2B is a block diagram of a video signal processing unit according to the first embodiment.

FIG. 2A is a block diagram of the video display system 1 according to the first embodiment. FIG. 2B is a block diagram of a video signal processing unit 12 according to the first embodiment.

In FIG. 2A and FIG. 2B, only constitutional elements necessary to describe characteristics of this embodiment are represented by functional block diagrams and description of general constitutional elements is omitted.

In other words, constitutional elements illustrated in FIG. 2A and FIG. 2B are functional and conceptual ones and do not necessarily have to be physically configured as illustrated. For example, a specific form of distribution or integration of respective functional blocks is not limited to one illustrated and can be configured by functionally or physically distributing or integrating all or some of the functional blocks in an arbitrary unit according to various loads, use situations, or the like. This point is also the same for a block diagram (FIG. 6 and FIG. 7) which will be indicated later other than FIG. 2A and FIG. 2B.

First, as illustrated in FIG. 2A, the video display system 1 includes the video processing device 10, the liquid crystal display unit 20, and a video source 30. The liquid crystal display unit 20 corresponds to the liquid crystal module as previously described and includes a liquid crystal driving unit 21 corresponding to a liquid crystal driving driver IC and a liquid crystal panel 22. The video source 30 is, for example, an on-vehicle camera or a DVD player corresponding to various video sources.

The video processing device 10 includes a controller 11, the video signal processing unit 12, and a storing unit 13. The storing unit 13 is a storing device called a hard disk drive, a nonvolatile memory, or a resister and stores period information 13a.

The period information 13a is information relating to a predetermined period used for skipping a video and a period of time, during which at least the residual image phenomenon does not occur or the like is pre-specified and pre-registered.

The controller 11 controls video signal processing by the video signal processing unit 12. The controller 11 is configured by, for example, a control microcomputer.

Specifically, a video signal output from the video source 30 is input to the controller 11 and the video signal processing unit 12. The controller 11 obtains a control signal such as the vertical synchronizing signal or the horizontal synchronizing signal included in the input video signal. The controller 11 measures the predetermined period based on the period information 13a at any time. The measurement method may be, for example, a method by timer control or, for example, a method based on the number of processed frames or the number of processed fields.

The controller 11 outputs the obtained control signal to the video signal processing unit 12. However, in a case where the input video signal is the interlace video signal and a predetermined period arrives, the controller 11 controls to stop an output of a first obtained control signal (for example, the vertical synchronizing signal) after such an arrival of the predetermined period to the video signal processing unit 12. After controlling to stop the output of the vertical synchronizing signal, the controller 11 controls to restart the output of a next obtained vertical synchronizing signal to the video signal processing unit 12. In other words, the controller 11 does not control to stop the output of the next obtained vertical synchronizing signal to the video signal processing unit 12.

The video signal processing unit 12 generates a display video signal based on a video signal from the video source 30 and control of the controller 11 and outputs the generated display video signal to the liquid crystal display unit 20. Specifically, the video signal processing unit 12 obtains a video signal based on the output timing of the vertical synchronizing signal output from the controller 11 and generates a display video signal based on the obtained video signal so as to output the display video signal to the liquid crystal display unit 20.

The video signal processing unit 12 will be described more specifically using FIG. 2B. The video signal processing unit 12 includes an AD conversion unit 12a, an IP conversion unit 12b, and a generation unit 12c. When the vertical synchronizing signal is output from the controller 11 and the vertical synchronization period elapses, the AD conversion unit 12a obtains a video signal from the video source 30 and performs analog-to-digital conversion processing on the obtained video signal.

In a case where a video signal digitized by the AD conversion unit 12a is an interlace video signal, the IP conversion unit 12b performs IP conversion processing which converts such an interlace video signal to a non-interlace video signal, that is, signal corresponding to a progressive video signal.

Figure 3:
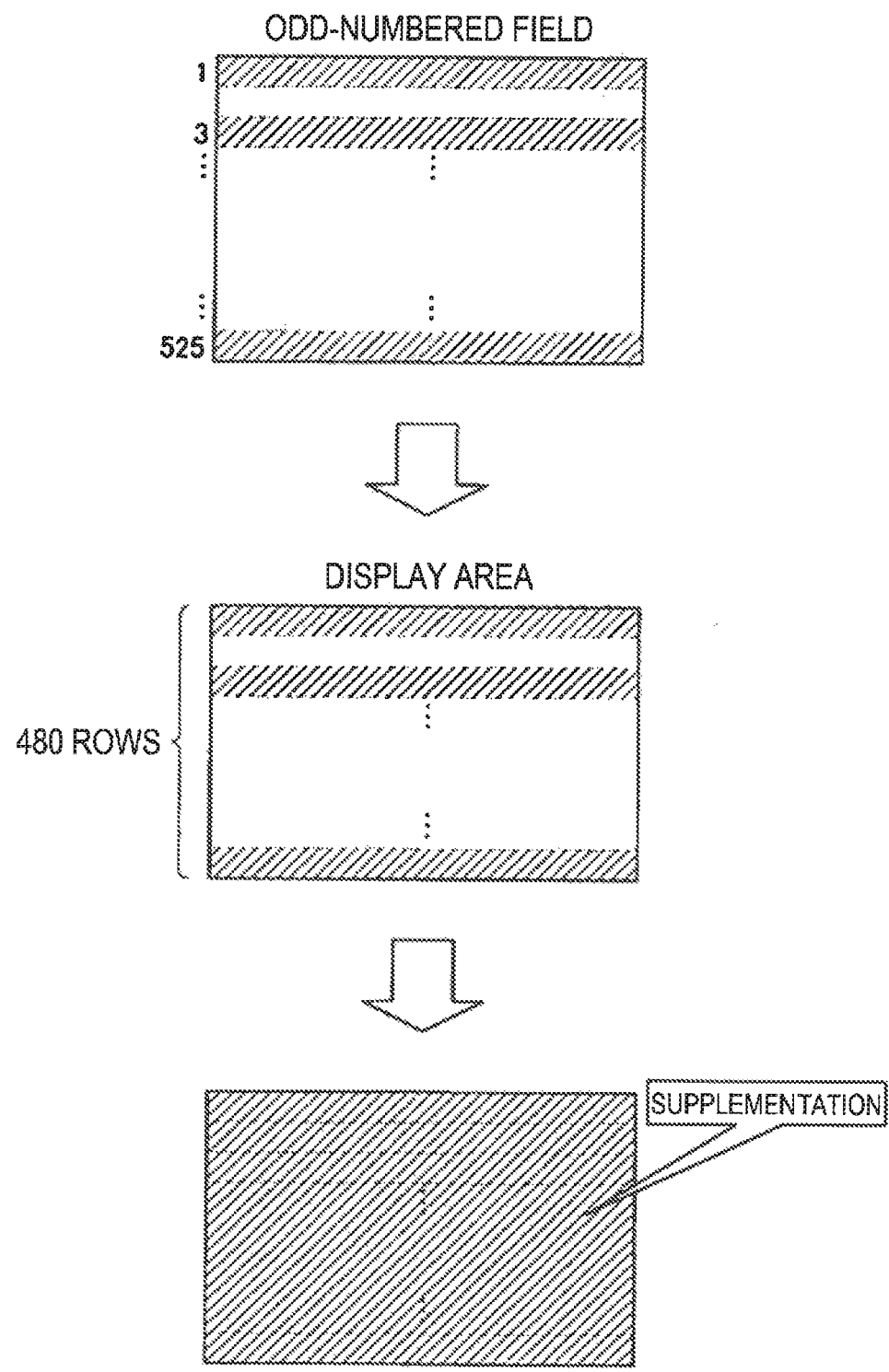
FIG. 3 is a processing explanation diagram of IP conversion processing.

Here, IP conversion processing by the IP conversion unit 12b will be described using FIG. 3. FIG. 3 is a processing explanation diagram of IP conversion processing. In FIG. 3, although the odd-numbered field in the interlace video signal is exemplified, it is also the same for the even-numbered field.

Although description is made in the above, as illustrated in FIG. 3, the odd-numbered field is formed with only scanning lines of odd-numbered rows, but, for example, it is assumed that in a case where one frame is configured with 525 rows, the number of rows of the odd-numbered field becomes 263 rows.

On the other hand, for example, in a case where a display area of the liquid crystal panel 22 is 480 rows as illustrated in an intermediate stage of FIG. 3, some of (for example, upper portion, lower portion, or the like) 263 rows of the odd-numbered field need to be thinned so as to be fallen within one half of such 480 rows, that is 240 rows. The IP conversion unit 12*b* performs such processing.

As illustrated in the intermediate stage of FIG. 3, an empty portion is caused at an area corresponding to the even-numbered field not just for 240 rows of the odd-numbered field. As illustrated in the lower stage of FIG. 3, the IP conversion unit 12*b* performs processing for supplementing the empty area based on 240 rows of the odd-numbered field. Such supplementation can be performed by, for example, enlarging respective rows of the odd-numbered field.

Although the IP conversion can be performed by accumulating the odd-numbered field and the even-numbered field on a frame memory to be combined, such a method is not daringly used in this embodiment.

Referring back to description of FIG. 2B, description of the generation unit 12*c* will be followed. The generation unit 12*c* generates the display video signal to the liquid crystal display unit 20 based on the video signal from the IP conversion unit 12*b* and outputs the display video signal to the liquid crystal display unit 20.

Figure 4:
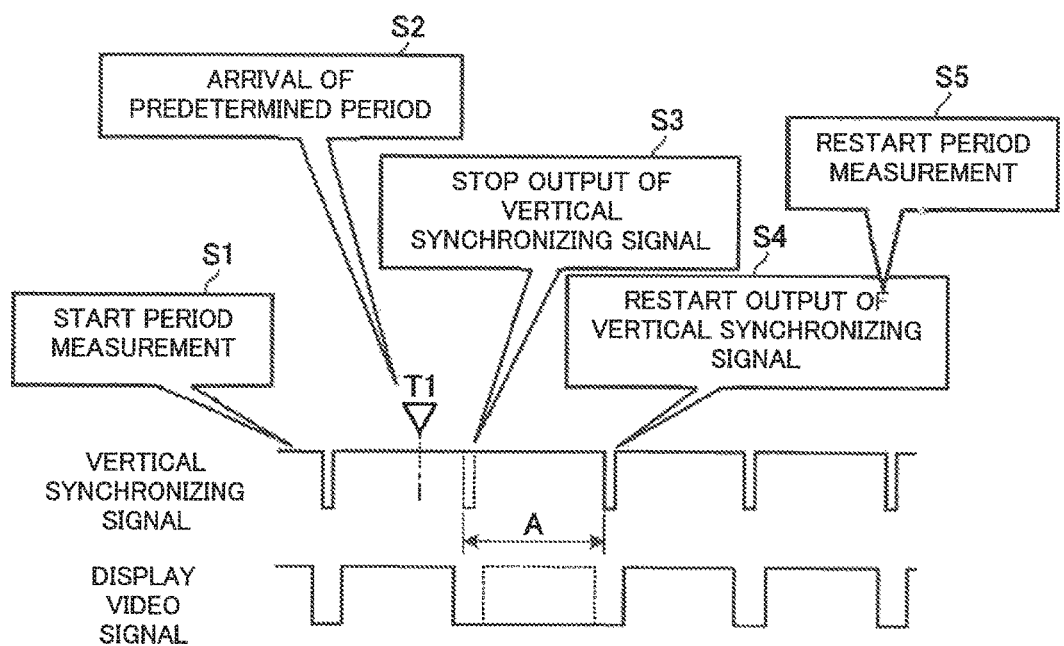
FIG. 4 is a processing explanation diagram of video skipping processing.

Here, video skipping processing in a case where the video signal is the interlace video signal will be described more specifically using FIG. 4. FIG. 4 is a processing explanation diagram of video skipping processing.

As illustrated in FIG. 4, the controller 11 first starts predetermined period measurement (Step S1). The controller 11 outputs the vertical synchronizing signal obtained from the video source 30 directly to the video signal processing unit 12 until the predetermined period arrives. As described above, when the vertical synchronizing signal is output, the video signal processing unit 12 obtains a video signal from the video source 30 so as to generate a display video signal and outputs the display video signal to the liquid crystal display unit 20.

Here, it is assumed that the predetermined period arrives at time T1 (Step S2). The controller 11 stops an output of a first obtained vertical synchronizing signal after such an arrival of the predetermined period to the video signal processing unit 12 (Step S3). With this, since the vertical synchronizing signal is not output, the video signal processing unit 12 does not obtain a video signal. As a result, as shown in FIG. 4 with broken lines, a display video signal corresponding to the stopped vertical synchronizing signal (display video signal corresponding to a "black 3" of the video signal in an example of FIG. 1F) is not generated.

As such, in a case where the predetermined period arrives, the controller 11 controls to stop the output of the vertical synchronizing signal once so that a display invalid section A of one field is set for the interlace video signal. Therefore, in the video signal processing unit 12, the display video signal is generated based on the interlace video signal in which the display invalid section A is set by stop control of the vertical synchronizing signal. That is, the display video signal which does not include the display video signal corresponding to the "black 3" of the video signal in the example of FIG. 1F is generated and such a display video signal is output to the liquid crystal display unit 20.

Subsequently, after performing the stop control of the vertical synchronizing signal, the controller 11 controls to restart the output of an obtained vertical synchronizing signal to the video signal processing unit 12 (Step S4). With this, setting of the display invalid section A which has been set for the interlace video signal is released.

After conducting Step S4, the controller 11 restarts the predetermined period measurement (Step S5). Restarting referred to herein is restarting performed from an initial value. With this, video skipping processing is completed in one predetermined period. Such video skipping processing is repeated whenever the period arrives.

In a case where the video signal is the non-interlace video signal, without performing the stop control of the vertical synchronizing signal, normal control of the vertical synchronizing signal in which the vertical synchronizing signal is directly output to the video signal processing unit 12 is performed. In other words, in a case where the non-interlace video signal is input, the controller 11 controls the vertical synchronizing signal such that the display invalid section A is not set for the non-interlace video signal. That is, in a case of the non-interlace video signal in which the residual image phenomenon is originally hard to occur, it is possible to perform video display in which the video quality is maintained while reducing a system load by avoiding useless video skipping processing.

Figure 5:
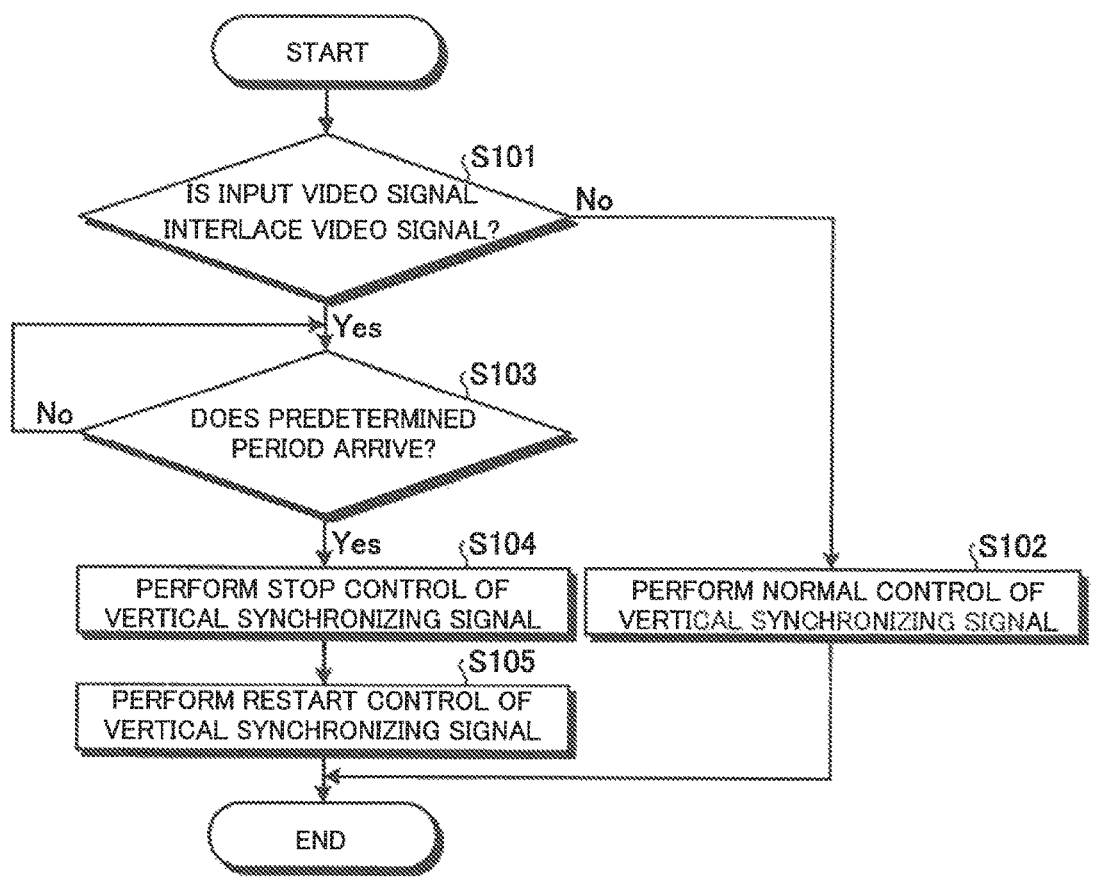
FIG. 5 is a flowchart illustrating a procedural sequence executed by a controller of a video processing device according to the first embodiment.

Next, a procedural sequence executed by the controller 11 of the video processing device 10 according to the first embodiment will be described using FIG. 5. FIG. 5 is a flowchart illustrating a procedural sequence executed by the controller 11 of the video processing device 10 according to the first embodiment.

As illustrated in FIG. 5, the controller 11 first determines whether an input video signal is the interlace video signal or not (Step S101). For example, in a case where the video signal includes an identifying signal that shows either the interlace video signal or the non-interlace video signal, processing of Step S101 may be conducted based on such an identifying signal.

In a case where it is determined that the video signal is not the interlace video signal (No in Step S101), that is, in a case of the non-interlace video signal, the controller 11 performs normal control of the vertical synchronizing signal (Step S102).

On the other hand, in a case where it is determined that the video signal is the interlace video signal (Yes in Step S101), subsequently, the controller 11 determines whether the predetermined period arrives or not (Step S103).

In a case where it is determined that the predetermined period does not arrives (No in Step S103), the controller 11 repeats processing of Step S103. While repeating the processing of Step S103, the controller 11 directly outputs the obtained vertical synchronizing signal to the video signal processing unit 12.

In a case where it is determined that the predetermined period arrives (Yes in Step S103), the controller 11 stops the output of the next obtained vertical synchronizing signal to the video signal processing unit 12 (Step S104). With this, a video of one field in the interlace video signal is skipped.

The controller 11 restarts the output of the vertical synchronizing signal obtained next to the stopped vertical synchronizing signal to the video signal processing unit 12 (Step S105).

As having been described above, the video processing device 10 according to the first embodiment is the video processing device 10 which generates the display video signal to the liquid crystal display unit 20 that is driven by the frame inversion scheme and includes the controller 11 and the video signal processing unit 12.

The controller 11 controls the vertical synchronizing signal included in the interlace video signal input from outside to set the display invalid section having a predetermined number of fields (here, one field) for the interlace video signal at a predetermined period. The video signal processing unit 12 generates the display video signal based on the interlace video signal in which the display invalid section A is set by control of the vertical synchronizing signal and outputs the display video signal to the liquid crystal display unit 20.

Accordingly, according to the video processing device 10 according to the first embodiment, it is possible to efficiently prevent the residual image phenomenon.

In the first embodiment, it is assumed that a predetermined number of fields which is set for the interlace video signal is one field. With this, since video skipping processing is completed early, it is possible to promptly prevent the residual image phenomenon.

There are two types of the liquid crystal display unit 20. One of the two types uses the "vertical synchronizing signal" and the other one uses a "data enable signal" that is a display valid instruction signal for a liquid crystal driving driver IC, as the control signal that is subjected to display control. The video processing device 10 according to this embodiment can be applied to the liquid crystal display unit 20 that is configured to use the vertical synchronizing signal as the control signal.

Second Embodiment

Next, a second embodiment will be described. In the following, portions different from those of the first embodiment will be mainly described and description of portions of which contents are duplicated will be omitted.

Figure 6:
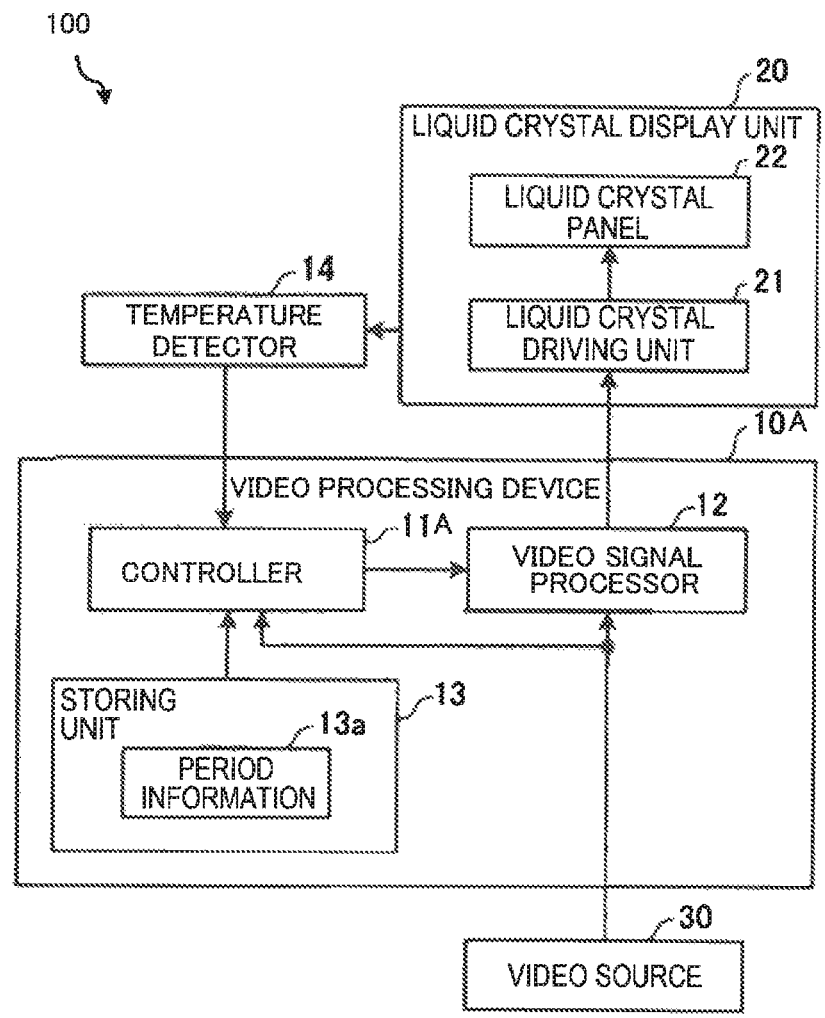
FIG. 6 is a block diagram of a video display system according to a second embodiment.

FIG. 6 is a block diagram of a video display system 100 according to the second embodiment. FIG. 6 corresponds to FIG. 2A and the second embodiment is different from the first embodiment in that a video processing device 10A further includes a temperature detector 14 communicably connected to a controller 11A in the video display system 100 according to the second embodiment.

The second embodiment is different from the first embodiment in that the controller 11A is able to rewrite the period information 13a.

The temperature detector 14 is a detection device detecting a temperature of the liquid crystal display unit 20. The controller 11A adjusts the predetermined period included in the period information 13a based on a detection result of such temperature detector 14.

For example, the controller 11A adjusts the period such that the predetermined period is gradually shortened as the temperature of the liquid crystal display unit 20 detected by the temperature detector 14 is increased. This is because occurrence of the residual image phenomenon becomes easier as the temperature is increased. As such, it is possible to suitably prevent the residual image phenomenon while adapting to temperature change by shorten intervals of the periods and increasing the number of times of video skipping as the occurrence frequency of the residual image phenomenon is increased. That is, it is possible to more efficiently prevent the residual image phenomenon.

As such, the video processing device 10A according to the second embodiment further includes the temperature detector 14 detecting the temperature of the liquid crystal display unit 20. The controller 11A adjusts the predetermined period included in the period information 13a based on the detection result of the temperature detector 14. The controller 11A adjusts the predetermined period to be gradually shortened as the detected temperature increases.

Therefore, it is possible to more efficiently prevent the residual image phenomenon according to the video processing device 10A according to the second embodiment.

Third Embodiment

Next, a third embodiment will be described. In the third embodiment, it is assumed that it is determined whether or not to perform the stop control of the vertical synchronizing signal based on a "display mode" that is set according to a type of the video signal input from outside.

Figure 7:
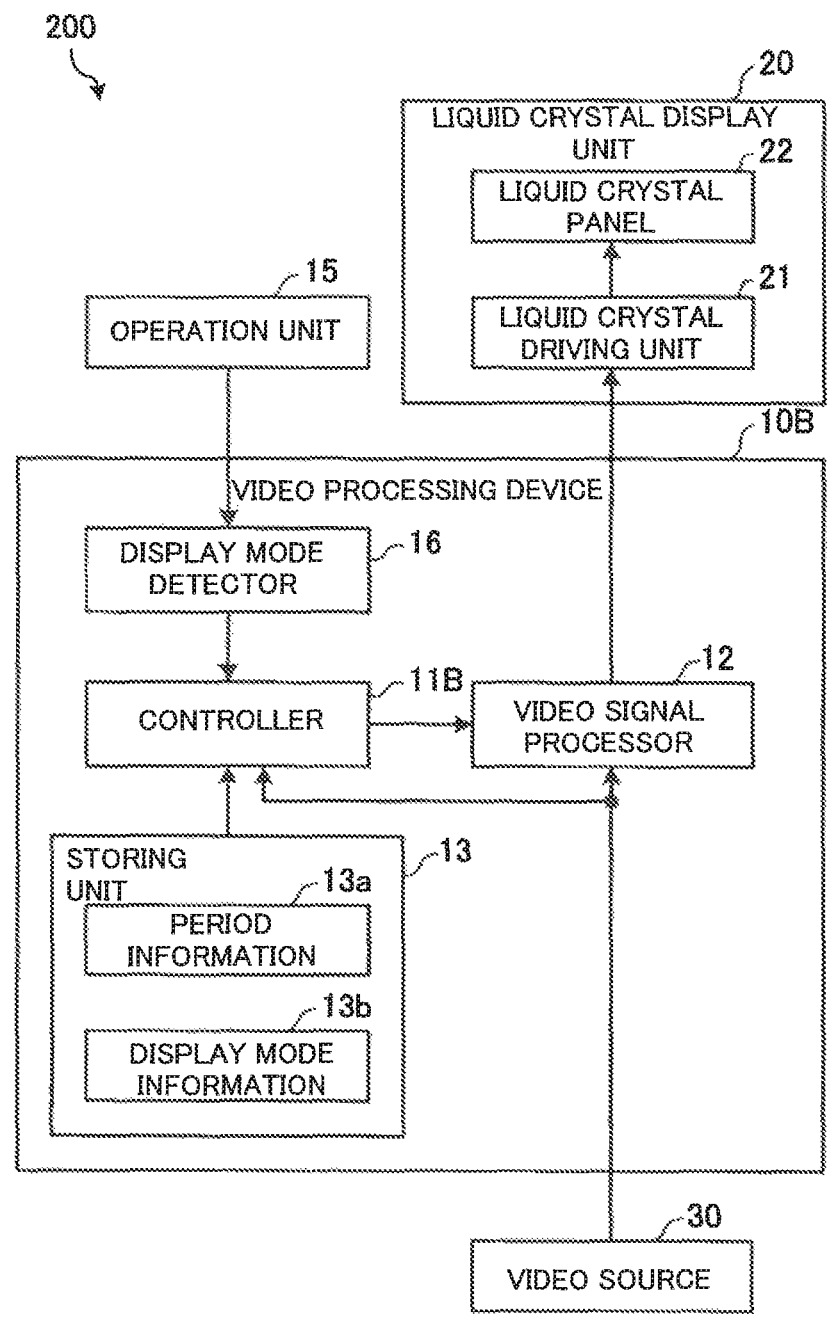
FIG. 7 is a block diagram of a video display system according to a third embodiment.

FIG. 7 is a block diagram of a video display system 200 according to the third embodiment. As illustrated in FIG. 7, the video display system 200 according to the third embodiment includes an operation unit 15. A video processing device 10B further includes a display mode detector 16, and the storing unit 13 further stores display mode information 13b.

In a case where the operation unit 15 is operated by a user such as a driver or a passenger of the vehicle C (refer to FIG. 1A), the operation unit 15 outputs a signal showing such operation contents to the display mode detector 16 of the video processing device 10B. For example, the operation unit 15 includes a selection button or the like to select a type of a video (a DVD video, a navigation video, a DTV video, an on-vehicle camera video, or the like) to be displayed on the liquid crystal display unit 20, and outputs the signal that shows the type of the selected video to the display mode detector 16 when the button is operated by the user.

The operation unit 15 may be configured to use an operation button that is provided in a vicinity of the liquid crystal display unit 20, but the invention is not limited thereto. For example, the operation unit 15 may be configured to use a touch panel or the like that is provided in a liquid crystal panel 22 of the liquid crystal display unit 20.

Although not shown in a figure, the signal that shows the type of the video to be displayed on the liquid crystal display unit 20 is input from the operation unit 15 to a video source controller, and such a video source controller may be configured to start the video source 30 corresponding to the input signal. For example, in a case where the input signal is a signal showing the DVD video, the video source controller may be configured to start the DVD player among the video sources 30.

The operation unit 15 may include a shift position sensor or the like that detects a shift lever operated by the driver and a position of the shift lever. For example, in a case where the shift lever is switched to a reverse (R) range, the operation unit 15 may output a signal showing that the on-vehicle camera video (for example, a video from a rear camera for capturing images of an area behind the vehicle C) is displayed on the liquid crystal display unit 20 to the display mode detector 16.

The display mode detector 16 detects the display mode based on a signal from the operation unit 15, specifically, a signal showing the type of the video to be displayed on the liquid crystal display unit 20. For example, in a case where the signal showing the type of the video is the signal showing the DVD video, the display mode detector 16 detects that the display mode is a DVD mode. Similarly, in a case where the signal showing the type of the video is a signal showing the navigation video, the DTV video or the on-vehicle camera video, the display mode detector 16 detects that the display mode is a navigation mode, a DTV mode or an on-vehicle camera mode, respectively.

As such, the display mode detector 16 detects the display mode that is set according to the type of the video to be displayed on the liquid crystal display unit 20. In other words, the display mode detector 16 detects the display mode that is set according to the type of the video signal input from the video source 30. The display mode detector 16 outputs a signal showing the detected display mode to the controller 11B.

Here, the display mode information 13b will be described with reference to FIG. 8. FIG. 8 is a diagram illustrating an example of the display mode information 13b. As illustrated in FIG. 8, the display mode information 13b includes information such as the "display mode" or "setting of the stop control of the vertical synchronizing signal" or the like and such information is associated with each other.

The "display mode" is information that shows a type of the display mode. For "the display mode", for example, the DVD mode, the navigation mode, the DTV mode and the on-vehicle camera mode, etc. are registered.

The types of the display modes described above are merely examples and are not limited thereto. That is, for example, in a case where a user terminal such as a smartphone is connected to the video display system 200, as the video source 30, a user terminal mode corresponding to the user terminal is registered as the "display mode". As such, other types of the display modes may be registered.

The "setting of the stop control of the vertical synchronizing signal" is information that shows whether or not to execute the stop control of the vertical synchronizing signal. For example, in a case where the stop control is executed, the stop control is set to "ON", and in a case where the stop control is not executed, the stop control is set to "OFF".

Here, for example, in many cases, a DVD video signal or an on-vehicle camera video signal is an interlace video. Therefore, the "setting of the stop control of the vertical synchronizing signal" which corresponds to the DVD mode or the on-vehicle mode as the "display mode" is set to "ON".

On the other hand, for example, in many cases, a navigation video signal or a DTV video signal is a non-interlace video. Therefore, the "setting of the stop control of the vertical synchronizing signal" which corresponds to the navigation mode or the DTV mode as the "display mode" is set to "OFF".

ON/OFF settings of the stop control of the vertical synchronizing signal are merely examples and are not limited thereto. That is, for example, in a case where the interlace video is included in the DTV video signal, a corresponding "setting of the stop control of the vertical synchronizing signal" may be set to "ON".

Referring back to description of FIG. 7, the controller 11B executes determination processing to determine whether or not to execute the stop control of the vertical synchronizing signal based on a signal from the display mode detector 16 and the display mode information 13b. In other words, the controller 11B determines whether or not to control the vertical synchronizing signal such that the display invalid section A is set based on the display mode detected by the display mode detector 16 and the display mode information 13b.

That is, for example, in a case where the detected "display mode" is the DVD mode or the on-vehicle camera mode, the "setting of the stop control of the vertical synchronizing signal" in the display mode information 13b is set to "ON". Therefore, the controller 11B executes the stop control of the vertical synchronizing signal. On the other hand, in a case where the detected "display mode" is the navigation mode or the DTV mode, the "setting of the stop control of the vertical synchronizing signal" in the display mode information 13b is set to "OFF". Therefore, the controller 11B does not execute the stop control of the vertical synchronizing signal.

Figure 9:
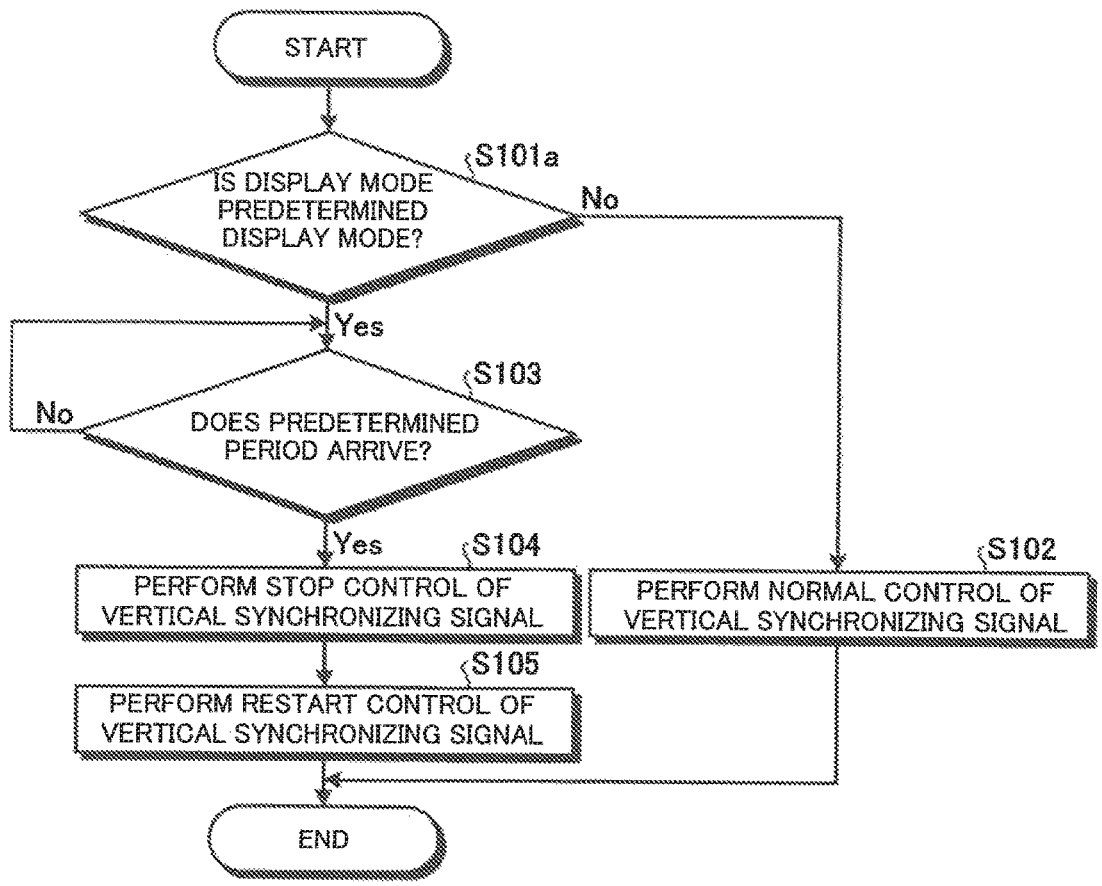
FIG. 9 is a flowchart illustrating a procedural sequence executed by a controller of a video processing device according to the third embodiment.

Next, a procedural sequence executed by the controller 11B of the video processing device 10B according to the third embodiment will be described using FIG. 9. FIG. 9 is a flowchart illustrating a procedural sequence executed by the controller 11B of the video processing device 10B according to the third embodiment.

As illustrated in FIG. 9, the controller 11B first determines whether the display mode detected by the display mode detector 16 is a predetermined display mode or not (Step S101a). Here, the predetermined display mode is, in the display mode information 13b, the display mode in which the "setting of the stop control of the vertical synchronizing signal" is set to "ON", that is, the display mode to perform the stop control of the vertical synchronizing signal.

In a case where it is determined that the display mode is the predetermined display mode (Yes in Step S101a), the controller 11B goes to processing of Steps S103 to S105 and performs the stop control of the vertical synchronizing signal, or the like.

On the other hand, in a case where it is determined that the display mode is not the predetermined display mode (No in Step S101a), the controller 11B goes to processing of Step S102 and does not perform the stop control of the vertical synchronizing signal, or the like, and performs normal control of the vertical synchronizing signal (Step S102).

As such, the video processing device 10B according to the third embodiment further includes the display mode detector 16. The display mode detector 16 detects the display mode that is set according to the type of the video signal input from outside. The controller 11B determines whether or not to control the vertical synchronizing signal such that the display invalid section A is set based on the detected display mode.

With this, in the third embodiment, it is possible to determine whether or not to control the vertical synchronizing signal such that the display invalid section A is set based on a simple processing to detect the display mode. Therefore, it is possible to more efficiently prevent the residual image phenomenon.

The video signal that is used for detecting the display mode is, for example, a video signal that is input from the on-vehicle device such as the DVD player mounted on the vehicle C. Therefore, in the third embodiment, it is possible to suitably use the video processing device 10B for on-vehicle.

Next, a modification example of the third embodiment will be described. In such a modification example, as shown in FIG. 8 with broken lines, the display mode information 13b may include a period of the stop control of the vertical synchronizing signal as the period information 13a.

Here, the "period of the stop control" is respectively set for the display mode in which the stop control is performed. Specifically, the "period of the stop control" is, in the corresponding display mode, for example, set at a period of time during which it is assumed that at least the residual image phenomenon does not occur.

In an example illustrated in FIG. 8, in a case where the "display mode" is the DVD mode and the "setting of the stop control of the vertical synchronizing signal" is "ON", the "period of the stop control" is set to n second. In a case where the "display mode" is the on-vehicle camera mode and the "setting of the stop control of the vertical synchronizing signal" is "ON", the "period of the stop control" is set to m second. The n second and the m second may be the same or different values.

The controller 11B according to the modification example first executes determination processing to determine whether or not to execute the stop control of the vertical synchronizing signal based on the display mode detected by the display mode detector 16. The period of the stop control may be changed according to a determination result of such a determination processing.

Specifically, for example, in a case where the display mode is the DVD mode and the determination result is one that the stop control is executed, the controller 11B changes the period to the n second and performs the stop control at the changed period. In other words, the controller 11B may control the vertical synchronizing signal such that the display invalid section A is set.

With this, in the modification example according to the third embodiment, it is possible to change the period to a suitable value according to the display mode. As a result, it is possible to more efficiently prevent the residual image phenomenon.

In the respective embodiments described above, it is assumed that a frame memory corresponding to at least one frame screen is not included. With this, it becomes possible to configure a system at low cost. Accordingly, for example, the embodiments are preferably applied to a product for spreading at a lower price like the product for a display audio or a rear seat entertainment system for on-vehicle.

In the respective embodiments described above, although the vertical synchronizing signal is controlled such that the display invalid section of one field is set for the interlace video signal at a predetermined period, the number of fields for which the display invalid section is set is at least one field and is not limited. Accordingly, a display invalid section of two or more fields may be set at a predetermined period.

In the above, description has been made on a case where the video processing device 10 and the liquid crystal display unit 20 are mounted on the vehicle C, but the invention is not limited thereto. For example, the video processing device 10 and the liquid crystal display unit 20 may be included in a liquid crystal television installed in a room, or the like.

In a case where the video processing device 10 or the like are included in the liquid crystal television installed in the room, or the like, the display mode information 13b may include a program guide display mode that shows information including a program guide, or a data broadcast display mode that shows data broadcast information. For example, in many cases, since the video signal to display information showing the program guide or data broadcast information is the non-interlace video, the corresponding "setting of the stop control of the vertical synchronizing signal" may be set to "OFF".

Further effects and a modification example may be easily derived by a person having ordinarily skilled in the art. For that reason, a broader aspect of the present invention is not limited to specific details and representative embodiments as having been described above. Accordingly, various changes may be made without departing from a spirit or a scope of a general inventive concept defined by attached claims and equivalents thereof.

While the invention has been shown and described in detail, the foregoing description is in all aspects illustrative and not restrictive. It is therefore understood that numerous other modifications and variations can be devised without departing from the scope of the invention.

What is claimed is:

1. A video processing device that generates a display video signal to be supplied to a liquid crystal display unit that is driven by a frame inversion scheme, the video processing device comprising:
   a controller that (a) receives an interlace video signal in which a field and a display invalid section including a vertical synchronizing signal alternately appear from outside the video processing device, and (b) controls the vertical synchronizing signal so that a length of the display invalid section is set so as to include a predetermined number of the fields; and
   a video signal processor that i) generates the display video signal based on the interlace video signal in which the length of the display invalid section has been set by control of the vertical synchronizing signal and ii) outputs the display video signal to the liquid crystal display unit.

2. The video processing device according to claim 1, further comprising:
   a temperature detector that detects a temperature of the liquid crystal display unit,
   wherein the controller adjusts the predetermined number of the fields based on a detection result of the temperature detector.

3. The video processing device according to claim 2, wherein the controller adjusts the predetermined number of the fields to be shortened as the temperature increases.

4. The video processing device according to claim 1, wherein the controller controls the vertical synchronizing signal such that the length of the display invalid section is not set for a non-interlace video signal,
   in a case where the non-interlace video signal is input from the outside of the video processing device.

5. The video processing device according to claim 1, further comprising:
   a display mode detector that detects a display mode set according to a type of a video signal input from the outside of the video processing device,
   wherein the controller executes determination processing to determine whether or not to control the vertical synchronizing signal to set the length of the display invalid section based on the detected display mode.

6. The video processing device according to claim 5, wherein the controller changes the predetermined number of the fields according to a determination result of the determination processing.

7. The video processing device according to claim 5, wherein the video signal is input from an on-vehicle device.

8. The video processing device according to claim 1, wherein the predetermined number of the fields is one field.

9. A video display system comprising:
   a liquid crystal display unit that is driven by a frame inversion scheme; and
   a video processing device that generates a display video signal to be supplied to the liquid crystal display unit,
   wherein the video processing device includes:
   a controller that (a) receives an interlace video signal in which a field and a display invalid section including a vertical synchronizing signal alternately appear from outside the video processing device, and (b) controls the vertical synchronizing signal so that a length of the display invalid section is set so as to include a predetermined number of the fields; and
   a video signal processor that i) generates the display video signal based on the interlace video signal in which the length of the display invalid section has been set by control of the vertical synchronizing signal and ii) outputs the display video signal to the liquid crystal display unit.

10. A video processing method of generating a display video signal to be supplied to a liquid crystal display unit that is driven by a frame inversion scheme, the method comprising the steps of:
  (a) receiving, with a controller, an interlace video signal in which a field and a display invalid section including a vertical synchronizing signal alternately appear from outside the controller;
  (b) controlling, with the controller, the vertical synchronizing signal so that a length of the display invalid section is set so as to include a predetermined number of the fields; and
  (c) generating, with a video signal processor, the display video signal based on the interlace video signal in which the length of the display invalid section has been set by control of the vertical synchronizing signal and outputting the display video signal to the liquid crystal display unit.

* * * * *